United States Patent [19]

Blohm et al.

[11] Patent Number: 5,187,608

[45] Date of Patent: * Feb. 16, 1993

[54] SUBSTITUTED 3,4-POLYMETHYLENEDIOXYTHIOPHENES, AND POLYMERS AND ELECTRO RESPONSIVE DEVICES MADE THEREFROM

[75] Inventors: Margaret L. Blohm; James E. Pickett, both of Schenectady; Paul C. VanDort, Clifton Park, all of N.Y.

[73] Assignee: General Electric Company, Schenectady, N.Y.

[*] Notice: The portion of the term of this patent subsequent to May 5, 2009 has been disclaimed.

[21] Appl. No.: 806,400

[22] Filed: Dec. 13, 1991

Related U.S. Application Data

[62] Division of Ser. No. 663,524, Mar. 4, 1991, Pat. No. 5,111,327.

[51] Int. Cl.$^5$ .................................................. G02F 1/01
[52] U.S. Cl. ................................ 359/273; 359/265; 359/275
[58] Field of Search ..................... 359/273, 275, 265

[56] References Cited

U.S. PATENT DOCUMENTS

| | | | |
|---|---|---|---|
| 4,375,318 | 3/1983 | Giglia et al. | 359/270 |
| 4,573,768 | 3/1986 | Polak et al. | 359/270 |
| 4,750,817 | 6/1988 | Sammells | 359/270 |
| 4,772,940 | 9/1988 | Wudl et al. | 358/59 |
| 4,795,242 | 1/1989 | Wudl et al. | 359/265 |
| 4,887,890 | 12/1989 | Scherber et al. | 359/265 |
| 4,893,908 | 1/1990 | Wolf et al. | 359/275 |
| 5,042,923 | 8/1991 | Wolf et al. | 359/275 |

FOREIGN PATENT DOCUMENTS

| | | |
|---|---|---|
| 0339340 | 4/1989 | Fed. Rep. of Germany . |
| 0203438 | 5/1986 | France . |
| 63157132 | 12/1986 | Japan . |
| 01688 | 7/1987 | Japan . |

OTHER PUBLICATIONS

Article-Preparation and Use of Thiophene Derivative Polymers, Jonas Friedrich, et al-CA Selects: Conductive Polymers, Issue 10 (1990) 112:159213z (1 page).

Article-Preparation of (alkylenedioxy)thiophene Polymers for Use as Antistatic Agents-J Friedrich et al-CA Selects Electrically Conductive Organics, Issue 18 (1990) p. 2.

Article-Optical, Electrochemical, and Conductive Properties of Poly(3-alkoxy-2,5-thienylene Vinylenes), Kwan-Yue Jen, et al-J. Chem. Soc., Chem. Commun. (1988) pp. 215-218.

Article-Special Report-Conductive Polymers, Mercouri G. Kanatzidls-C&EN-Dec. 13, 1990-pp. 36-40; 42; 44-50 and 54.

Primary Examiner—Rolf Hille
Assistant Examiner—Mahshid Saadat
Attorney, Agent, or Firm—William A. Teoli; William H. Pittman

[57] ABSTRACT

Substituted 3,4-dimethylenedioxythiophenes are provided. The substituted 3,4-dimethylenedioxythiophenes can be polymerized by chemical or electro-chemical means to produce polymers which are useful as EMI shielding and for making smart windows and switches.

7 Claims, 1 Drawing Sheet

SUBSTITUTED 3,4-POLYMETHYLENEDIOXYTHIOPHENES, AND POLYMERS AND ELECTRO RESPONSIVE DEVICES MADE THEREFROM

This application is a division of application Ser. No. 07/663,524 filed Mar. 4, 1991, U.S. Pat. No. 5,111,32.

BACKGROUND OF THE INVENTION

The present invention relates to substituted 3,4-dimethylenedioxythiophenes which can be made by effecting reaction between a 2,5-carbalkoxy-3,4-dihydroxy-thiophene and an epihalohydrin. More particularly the present invention relates to polymeric substituted 3,4-polymethylenedioxythiophenes which can be used for EMI shielding, smart windows and switches.

Prior to the present invention, as shown by European Pat. No. 0339340, poly(3,4-dialkoxythiophenes) having the formula,

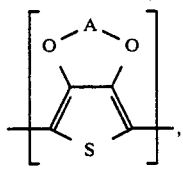

were provided useful as anti-static materials, where A is a $C_1$–$C_4$ alkylene radical, a cyclohexyl radical or a phenyl substituted ethylene radical. There was also discussed by Mercouri G. Kanatzidis, in the Dec. 3, 1990, Special Report on Conductive Polymers on pages 36–54 of the Chemical And Engineering News, incorporated herein by reference, that polythiophenes were useful in making electrochromic devices. An electrical potential can be applied in the presence of an electrolyte to a polythiophene film applied onto a conductive surface, such as, an $SnO_2$ coated glass to cause doping and undoping in the conductive polymer. As used hereinafter, the term "doping" means the oxidized state or conductive state of an electroactive or electro-optically responsive polymer, while "undoped" means the reduced state or non-conductive state. Other applications of conductive polymers are shown by Wolf et al, U.S. Pat. No. 4,893,908, directed to Adjustable Tint Window With Electrochromic Conductive Polymer. Although considerable progress has been made in the synthesis and investigation of conductive organic polymers, sometimes referred to as "synthetic metals", further effort is needed to discover additional organic polymers having improved conductive and electro-responsive properties.

SUMMARY OF THE INVENTION

The present invention is based on the discovery that substituted 3,4-polymethylenedioxythiophenes of the formulas,

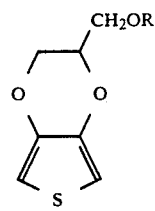

and

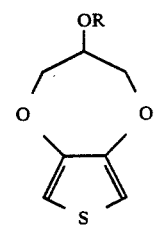

where R is hydrogen or a $C_{(1-18)}$ organic radical, can be converted by chemical or electrochemical polymerization to a variety of poly(3,4-polymethylenedioxythiophenes) having valuable conductive and optical properties. Surprisingly, the polythiophenes resulting from the polymerization of substituted dioxythiophenes of formulas (2) and (3), provide significant advantages over the polymers of formula (1) with respect to conductivity and optical properties.

STATEMENT OF THE INVENTION

Figure 1:
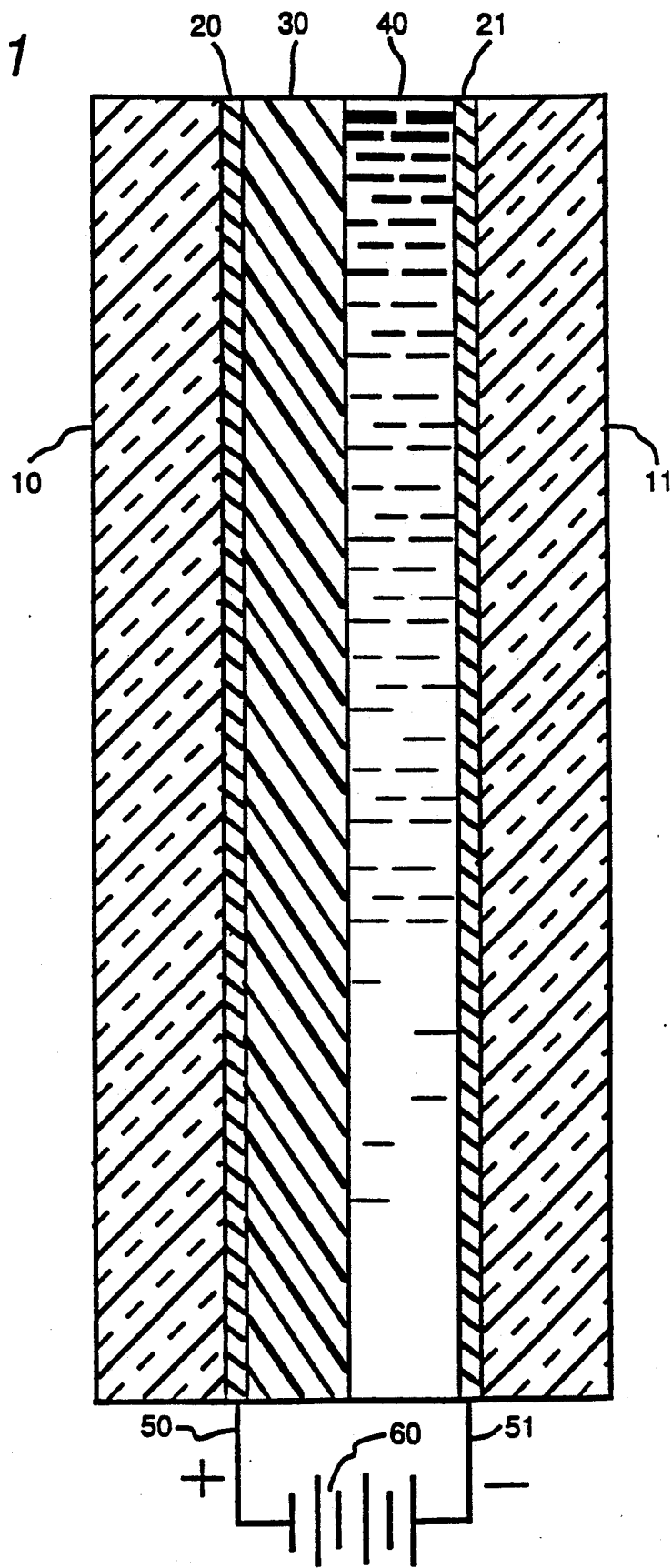
FIG. 1 is a schematic of a switching device, or an electro-optical device.

There is provided by the present invention, an electro-optical device comprising an electrode which is optically transparent, treated with an electro-optically responsive polymer which is in contact with a liquid or solid electrolyte, which is in further contact with a second electrode, which electro-optical device is capable of repeatedly providing a contrast ratio (CR) of light transmittance in the region of 250 to 2500 nm having a value of 1 to 10,000, as a result of the application of an electric potential across the electrodes of the electro-optical device to effect an electro-optical responce in the electro-optically responsive polymer to convert it from the undoped or reduced state to the doped or oxidized state and from doped or oxidized state to undoped or reduced state, where CR is defined as follows, $$CR = \frac{\% \text{ transmittance (doped)}}{\% \text{ transmittance (undoped)}}$$

where the electro-optically responsive polymer comprises polymer having repeat units selected from,

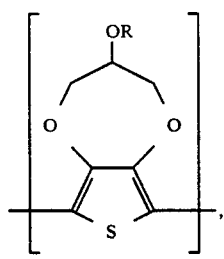

(4)

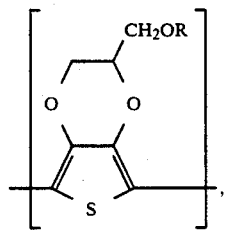

(5)

and copolymers comprising chemically combined units of (4) and (5), where R is as previously defined.

The substituted 3,4-polymethylenedioxythiopenes of formulas (2) and (3) can be made by initially effecting reaction between a 2,5-dicarbalkoxy-3,4-dihydroxysthiophene and an epihalohydrin followed by saponification and decarboxylation as shown by the following reaction scheme:

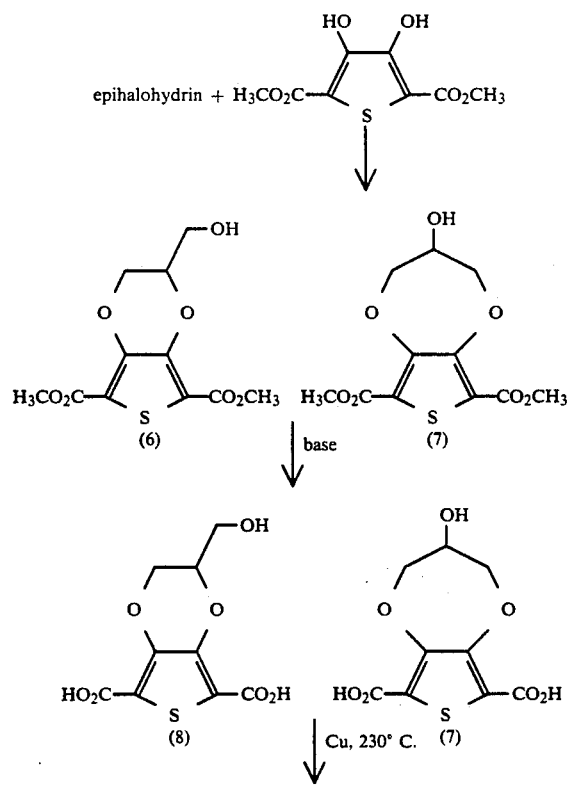

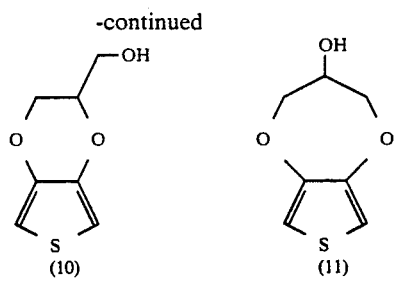

The monomers shown above by formulas 10 and 11 and derivatives thereof can be polymerized separately or used as a mixture and copolymerized.

An additional aspect of the invention is shown by the drawing which is a schematic of a switching device, or an electro-optical device.

There is shown more particularly, in the drawing, substrates at 10 and 11 which can be glass or a transparent glazing material, such as a polycarbonate or polymethylmethacrylate. At 20 and 21 there is shown a conductive layer which can be $SnO_2$, or a combination of indium and $SnO_2$. A conductive polythiophene as shown by formulas (4) or (5) or a copolymer thereof is shown at 30, while a solid or liquid electrolyte is shown at 40. Electrodes are shown at 50 and 51 and a power supply is shown at 60.

Conductive blends of polythiophene of formulas (4) or (5) or a copolymer thereof and thermoplastics such as polyphenylene oxides, and polyesters, polyimides, polyetherimides and polycarbonates can be cast into films using a suitable organic solvent.

In order that those skilled in the art will be better able to practice the present invention, the following examples are given by way of illustration and not by way of limitation.

EXAMPLE 1

There was added 7.7 ml (90.2 mmol) of epibromohydrin and 1.92 g (13.9 mmol) of potassium carbonate dissolved in 100 ml of water to a refluxing mixture of 16.11 g (69.4 mmol) of 2,5-methoxycarbonyl-3,4-dihydroxythiophene and 350 ml of ethanol. After heating at reflux for one hour, an additional 5.34 ml (62.4 mmol) of epibromohydrin was added. After heating at reflux for 15 hours, an additional 1.0 g (7.2 mmol) of potassium carbonate and 3.0 ml (35 mmol) of epibromohydrin were added. The mixture was heated at reflux for a total of 48 hours, and was cooled and poured into 300 ml of brine. The resulting solution was extracted with chloroform, dried over magnesium sulfate, filtered, and the solvent was removed under vacuum. There was obtained a yellow solid which was recrystallized from ethanol to give 13 g (65% yield) of a white crystalline material. Based on NMR spectrum, the product was a mixture consisting of ~70% of the compound shown by formula 6, and ~30% of the compound shown by formula 7. If desired, the compounds can be separated by flash chromatography on silica gel. The identities of these compounds were further confirmed as follows:

In formula 6: mp=178.5°–180.5° C. $^1H$ NMR ($CDCl_3$): 2.79 ppm t (1H), 3.87 s (3H), 3.88 s (3H), 3.89–4.05 m (2H), 4.28 dd (1H), 4.35–4.43 m (1H), 4.47 dd (1H).

In formula 7: mp=208°–210° C. $^1H$ NMR ($CDCl_3$): 2.45ppm d (1H), 3.875 s (6H), 4.30–4.45 m (5H).

EXAMPLE 2

A solution of 1.08 g (19.2 mmol) of KOH dissolved in 30 ml of water was added to a solution of 2.77 g (9.61 mmol) of the above dimethoxycarbonylthiophene mixture in 60 ml of boiling ethanol. Ethanol was then evaporated by heating under a nitrogen purge. When the volume had been reduced to 30 ml, 1.60 ml of concentrated HCl (19.2 mmol) was added. The mixture was stirred for 12 hours resulting in the formation of a precipitate which was isolated by filtration, washed with water, and dried in a vacuum oven at 120° C. for 1 hour. There was obtained 2.38 g (95% yield) of a mixture of 2,5-thiophene dicarboxylic acids shown by formulas 8 and 9. The identities of these compounds were further confirmed as follows:

In formula 8: $^1$H NMR ($D_2O$): 3.79 ppm dd (1H), 3.86 dd (1H), 4.10 dd (1H), 4.31–4.41 m (2H).

In formula 9: $^1$H NMR ($D_2O$): 4.22–4.47 ppm m (5H).

EXAMPLE 3

A mass of 0.50 g (1.92 mmol) of the pure 2,5-dicarboxylic acid derivative shown by formula 8, which was obtained from the product mixture of example 1 by flash chromatography and saponified according to the procedure of example 2, was mixed with 0.20 g (3.1 mmol) of activated copper powder. After the addition of 3 drops of quinoline, the mixture was heated to 225° C. until gas evolution ceased (~20 min). The resulting residue was extracted with diethyl ether, and the combined ether extracts were filtered. The filtrate was washed once with 5% aqueous HCl and twice with brine. The organic layer was then dried over magnesium sulfate, filtered, and the ether was removed under vacuum to yield a viscous yellow oil. Further purification by flash chromatography on silica gel provided 0.21 g (64% yield) of the compound shown by formula (10). The identity of this compound was further confirmed as follows:

In formula 10: mp=41°–44° C. $^1$H NMR ($CDCl_3$): 2.00 ppm t (1H), 3.78–3.94 m (2H), 4.10 dd (1H), 4.20–4.30 m (2H), 6.334 d (1H), 6.350 d (1H). GC-MS (m/e): 172, 141, 127, 116.

Using the same procedure as above, the thiophene dicarboxylic acid shown by formula 9 was decarboxylated to give the thiophene shown by formula 11 in 80% yield. The identity of this compound was further confirmed as follows:

In formula 11: mp=84°–88° C. $^1$H NMR ($CDCl_3$): 2.82 ppm d (1H), 3.97 dd (2H), 4.00–4.10 m (1H), 4.23 dd (2H), 6.589 s (2H). GC-MS (m/e): 172, 141, 129, 116.

EXAMPLE 4

A solution of 0.30 g (1.74 mmol) of an 80:20 mixture of compounds of formulas (10) and (11) respectively, in 4 ml of toluene, was added to a suspension of 0.044 g (1.83 mmol) of sodium hydride in 2 ml of toluene under a nitrogen atmosphere. The resulting solution was heated at reflux for 1 hour. A solution of 0.158 ml (1.74 mmol) of propane sultone in 2 ml toluene was then added to the reaction mixture over 5 minutes. The resulting mixture was heated at reflux for an additional 2 hours. The solution was cooled, and 35 ml of acetone was added while the mixture was stirred rapidly. A white slurry formed which was filtered through a fine porosity frit and washed with acetone while under a nitrogen blanket. After drying at 120° C. under vacuum for 1 hour there was obtained 0.47 g (86% yield) of an off-white powder. The product consisted of an 80:20 mixture of compounds of formulas 2 and 3 respectively where R is —$(CH_2)_3SO_3Na$. The identities of these compounds were further confirmed as follows:

In formula 2, R is —$(CH_2)_3SO_3Na$: $^1$H NMR ($D_2O$): 2.93 ppm t (2H), 1.90–2.09 m (2H), 3.66 t (2H), 3.71–3.80 m (2H), 4.09 dd (1H), 4.27 dd (1H), 4.38–4.46 m (1H), 6.48 d (1H), 6.50 d (1H).

In formula 3, R is —$(CH_2)_3SO_3Na$: $^1$H NMR ($D_2O$): 2.93 ppm t (2H), 1.90–2.09 m (2H), 3.65 t (2H), 3.88–3.95 m (1H), 4.02 dd (2H), 4.34 dd (2H), 6.71 s (2H).

EXAMPLE 5

A solution of 0.34 g (2.0 mmol) of an 80:20 mixture of compounds of formulas (10) and (11) respectively and 0.22 g (2.2 mmol) of succinic anhydride in 5 ml of ethyl acetate was purged with nitrogen. There was added 0.31 ml (2.2 mmol) of triethylamine, and the solution was allowed to stir for 42 hours at room temperature. The resulting solution was then diluted with 10 ml of ethyl acetate and washed successively with 5% HCl, dilute sodium bicarbonate and brine. The ethyl acetate solution was dried over magnesium sulfate and the solvent removed under reduced pressure. There was obtained a viscous yellow oil which was chromatographed on silica gel to give 0.24 g (44% yield) of product which crystallized slowly at room temperature. The product consisted of an 85:15 mixture of compounds of formulas 2 and 3 respectively, where R is —$CO(CH_2)_2CO_2H$; mp (of mixture) = 58°–65° C. The identities of these compounds were further confirmed as follows:

In formula 2, R is —$CO(CH_2)_2CO_2H$: $^1$H NMR ($CDCl_3$): 2.63–2.75 ppm m (4H), 4.03 dd (1H), 4.21 dd (1H), 4.30–4.42 m (3H), 6.34 d (1H), 6.36 d (1H), 10.7 broad s (1H). GC-MS (m/e): 272, 172, 154, 141, 125, 116, 101.

In formula 3, R is —$CO(CH_2)_2CO_2H$: $^1$H NMR ($CDCl_3$): 6.51 ppm s (2H) (thiophene protons). GC-MS (m/e): 272, 172, 154, 141, 125, 116, 101.

EXAMPLE 6

Under a nitrogen atmosphere, 5.45 g (18.9 mmol) of a 70:30 mixture of compounds of formulas (6) and (7) respectively and 2.59 ml (21.8 mmol) of benzyl bromide were added to a rapidly stirring slurry of 0.522 g (21.8 mmol) of sodium hydride in 40 ml of tetrahydrofuran under nitrogen. The resulting mixture was stirred for 48 hours, diluted with chloroform, and washed with 5% HCl. Upon removal of solvent under reduced pressure, an off white solid was isolated. The product was saponified according to the procedure in example 2 and decarboxylated according to the procedure in example 3. The decarboxylated product was purified by flash chromatography on silica gel. There was obtained 3.31 g (68% yield) of a viscous, light yellow oil consisting of a 97:3 mixture of compounds of formulas 2 and 3 respectively where R is —$CH_2C_6H_5$. The identities of these compounds were further confirmed as follows:

In formula 2, R is —$CH_2C_6H_5$: $^1$H NMR ($CDCl_3$): 3.65 ppm dd (1H), 3.74 dd (1H), 4.08 dd (1H), 4.25 dd (1H), 4.30–4.39 m (1H), 4.60 s (2H), 6.324 d (1H), 6.344 d (1H), 7.27–7.41 m (5H). GC-MS (m/e): 262, 156, 147, 141, 127, 117, 104, 91.

In formula 3, R is —$CH_2C_6H_5$: $^1$H NMR ($CDCl_3$): 6.477 ppm s (2H) (thiophene protons). GC-MS (m/e): 262, 156, 147, 141, 127, 117, 104, 91.

EXAMPLE 7

Under a nitrogen atmosphere, 0.42 g (2.4 mmol) of a 75:25 mixture of compounds of formulas (10) and (11) respectively and 0.39 ml (2.8 mmol) of n-hexyl bromide were added to a slurry of 0.065 g (2.7 mmol) of sodium hydride in 12 ml of tetrahydrofuran. The resulting mixture was heated at reflux for 48 hours, cooled, diluted with chloroform, washed successively with 5% HCl and brine, and dried over magnesium sulfate. Upon the removal of the solvent under reduced pressure, there was obtained a yellow oil. Further purification of the product was accomplished by flash chromatography on silica gel. There was obtained 0.42 g (68% yield) of product consisting of a 75:25 mixture of compounds of formulas 2 and 3 respectively where R is $-(CH_2)_5CH_3$. The identities of these compounds were further confirmed as follows:

In formula 2, R is $-(CH_2)_5CH_3$: $^1H$ NMR ($CDCl_3$): 0.89 ppm t (3H), 1.20–1.40 m (6H), 1.52–1.64 m (2H), 3.49 t (2H), 3.59 dd (1H), 3.69 dd (1H), 4.06 dd (1H), 4.25 dd (1H), 4.27–4.35 m (1H), 6.318 d (1H), 6.334 d (1H). GC-MS (m/e): 256, 185, 172, 156, 142, 127, 116.

In formula 3, R is $-(CH_2)_5CH_3$: $^1H$ NMR ($CDCl_3$): 0.89 ppm t (3H), 1.20–1.40 m (6H), 1.52–1.64 m (2H), 3.54 t (2H), 3.79–3.88 m (1H), 4.08 dd (2H), 4.24 dd (2H), 6.465 s (2H). GC-MS (m/e): 256, 185, 172, 156, 142, 127, 116.

EXAMPLE 8

An electrolytic cell was prepared utilizing a four neck, round bottom flask equipped with a nitrogen purge, a platinum wire counter electrode, a Ag/AgBr reference electrode (saturated tetraethylammonium bromide in acetonitrile), and an indium-tin oxide (ITO) coated glass working electrode (1 ×2 centimeters). The cell was then charged with various thiophene monomers or comonomers of formulas 10 and 11 where R is $-H$, $-CO(CH_2)_2CO_2H$, $CH_2C_6H_5$, or $-(CH_2)_5CH_3$, employing 15 ml of a 0.15 molar tetrabutylammonium tetrafluoroborate solution in dried and deoxygenated acetonitrile and 25–50 mg of thiophene monomer. Application of 1.3 to 2 volts to the ITO coated glass led to visible deposition of light gray to blue-green flims of doped polymer. By reversing the potential until no current flowed, the polymers could be reduced to the dark blue undoped state. The thicknesses of the various films were found to be proportional to the time of polymerization.

EXAMPLE 9

In accordance with the procedure of Example 8, the electrolytic cell was charged with 15 ml of a 0.15 molar solution of tetrabutylammonium tetrafluoroborate in deoxygenated acetonitrile and 25 mg of the mixture of thiophenes of Example 4 dissolved in 2 ml of deionized water. Application of 1.4 volts to the cell led to the deposition of a polymeric film over 30–60 minutes. The copolymer was found to be soluble in water in both doped and undoped states.

EXAMPLE 10

A solution was prepared by dissolving 26 mg (0.046 mmol) of iron (III) p-toluenesulfonate and 10 mg (0.038 mmol) of thiophene of formula 2 where R is $-CH_2C_6H_5$ into a mixture of 0.25 ml of acetone and 0.25 ml of isopropyl alcohol. This solution was applied onto a variety of substrates such as glass, ITO coated glass, polycarbonate, polyester and polyimide. The thiophene polymerized as the solvent evaporated over a period of ~30 minutes to give light gray to blue-green polythiophene films of formula 5 where R is $-CH_2C_6H_5$ doped with iron (III) p-toluenesulfonate.

Films with thicknesses between 0.1 and 2 microns were prepared in this way by varying the concentration of the above solution.

Polymers and copolymers of formulas 4 and 5 where R is $-H$, $-CO(CH_2)_2CO_2H$, $-CH_2C_6H_5$, and $-(CH_2)_5CH_3$ were prepared using the above procedure. Doped polythiophene films were also made from the monomer mixture of example 4, except a solvent mixture of isopropanol and methanol was used.

EXAMPLE 11

Films prepared according to the procedure in example 8 were chemically reduced to the dark blue to purple undoped state by dipping the films in a 5–30% aqueous solution of ammonium hydroxide for 10 sec. - 10 min. and then rinsing the film with water and/or acetone.

EXAMPLE 12

Films prepared according to the procedure in example 8 and chemically reduced to the undoped state according to the procedure in example 11 were chemically re-oxidized into the light gray to blue-green doped state by dipping the undoped film into a ~3 mg/ml solution of ferric chloride in nitromethane for 30 sec. - 2 min. and then rinsing the film with nitromethane.

EXAMPLE 13

Films prepared according to the procedure in example 10 on conductive substrates such as ITO coated glass were repeatedly reduced into the undoped state and oxidized into the doped state, electrochemically, using an electrochemical cell similar to the one described in example 8.

EXAMPLE 14

The procedure of example 10 was repeated except that a dispersion of thiophene monomer of formula 2, where R is $-CH_2C_6H_5$ and polyphenylene ether equivalent to about 1% by weight of the total polymerization mixture was prepared. Evaporation of the solvent resulted in the formation of a polythiophene polymer in the host polyphenylene ether. Films of the blend were cast from chloroform to form a polyphenylene ether film having antistatic properties.

EXAMPLE 15

A thin film of polythiophene of formula 5 (where R is $-H$) was prepared on the surface of a 1"×1"×1/16" quartz plate according to the procedure in example 10. It was then undoped according to the procedure in example 11 and re-doped with ferric chloride according to the procedure in example 12.

The conductivity of the film was found to be 112 $S \cdot cm^{-1}$ using the four-point-in-line probe technique as shown in PCT/US87/01688, pg. 35. The conductivities of films of additional polymers and copolymers of formulas 4 and 5 where R was $-H$, $-(CH_2)_5CH_3$, $-CH_2C_6H_5$, $-(CH_2)_3SO_3Na$, or $-CO(CH_2)_2CO_2H$ prepared in an identical manner to the above polymer, were found to be in the range of 35 to 108 $S \cdot cm^{-1}$.

In contrast, a conductivity no higher than 7.7 $S \cdot cm^{-1}$ was found for the unsubstituted dimethylenedioxy polythiophene of formula 1, where A is —(CH$_2$)$_2$— prepared in an identical manner to the above polymers.

EXAMPLE 16

A 0.30 micron thick film of polythiophene of formula 5 (where R is —(CH$_2$)$_5$CH$_3$) was prepared on the surface of a 1"×1"×1/16" quartz plate according to the procedure in example 8. A transmittance spectrum of the doped film was taken between 250 and 2500 nm using a Hitachi model U-3410 spectrophotometer. The spectrum was referenced to a blank quartz plate identical to the one used as the substrate for the polymer film.

The polymer film was then undoped according to the procedure in example 11, and a transmittance spectrum was taken of the undoped film using exactly the same procedure as described above.

The polymer film was then re-doped with ferric chloride according to the procedure in example 12, and a transmittance spectrum of the film doped with ferric chloride was taken using exactly the same procedure as described above.

The contrast ratio "CR" of the doped film relative to the undoped film was measured. CR is defined at any wavelength between 250 and 2500 nm as follows:

$$CR = \frac{\% \text{ transmittance (doped)}}{\% \text{ transmittance (undoped)}}$$

Additional polythiophene films were prepared from the monomers of examples 3–6 following the same procedure. Polythiophene films, where A in formula (1) is —(CH$_2$)$_2$— were also made following the same procedure. It was found that the CR of the films made from monomers of examples 3–7, were substantially equivalent or better than the films made from the formula 1 monomer. The following results show the average CR value of a 0.32 micron thick film of formula 1, where A was —(CH$_2$)$_2$— and a 0.30 micron thick film of formula 5, where R is —(CH$_2$)$_5$CH$_3$.

| Wavelength of light (nm) | 400 | 450 | 500 | 550 | 600 | 650 | 700 |
|---|---|---|---|---|---|---|---|
| Formula 1 | | | | | | | |
| % transmittance doped | 29% | 41% | 38% | 29% | 20% | 13% | 9% |
| % transmittance undoped | 20% | 9% | 3.3% | 3.1% | 6% | 15% | 30% |
| CR | 1.5 | 4.6 | 11.5 | 9.4 | 3.3 | 0.87 | 0.30 |
| Average Contrast Ratio = 4.5 | | | | | | | |
| Formula 5 | | | | | | | |
| % transmittance doped | 40% | 60% | 62% | 60% | 55% | 51% | 48% |
| % tranttance undoped | 39% | 30% | 14% | 3.5% | 1.6% | 1.8% | 16% |
| CR | 1.0 | 2.0 | 4.4 | 17.1 | 34.4 | 28.3 | 3.0 |
| Average Contrast Ratio = 12.9 | | | | | | | |

Although the above examples are directed to only a few of the very many variables which can be used in the practice of the present invention, it should be understood that the present invention is directed to a much broader variety of thiophene monomers as shown by formulas 2 and 3, polythiophene polymers and copolymers as shown by formulas 4 and 5, electro-optical devices, and such applications as EMI shielding and electric conductors as shown in the description preceding these examples.

What is claimed is:

1. An electro-responsive device comprising an electrode treated with an electro-responsive polymer which is in contact with a liquid or solid electrolyte, which is in further contact with a second electrode, which electro-responsive-device is capable of repeatedly effecting an electro-response in an electro-responsive polymer to convert it from the undoped or reduced state to the doped or oxidized state, and from the doped state to the undoped state, where the electro-responsive polymer comprises polymers having repeat units of the formulas,

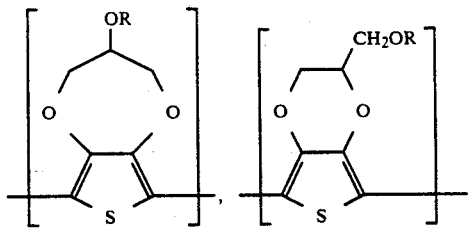

and copolymers comprising chemically combined repeat units thereof, where R is hydrogen or a C$_{(1-18)}$ organic radical.

2. An electro-responsive device in accordance with claim 1, where R is a C$_{(1-18)}$ organic radical.

3. An electro-responsive device in accordance with claim 1, where R is hydrogen.

4. An electro-responsive device in accordance with claim 1, where R is —(CH$_2$)$_3$SO$_3$Na.

5. An electro-responsive device in accordance with claim 1, where R is

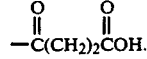

6. An electro-responsive device in accordance with claim 1, where R is

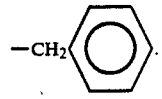

7. An electro-responsive device in accordance with claim 1, where R is —(CH$_2$)$_5$CH$_3$.

* * * * *